United States Patent
Zhamu et al.

(10) Patent No.: US 9,722,275 B2
(45) Date of Patent: Aug. 1, 2017

(54) ANODE PROTECTIVE LAYER COMPOSITIONS FOR LITHIUM METAL BATTERIES

(75) Inventors: Aruna Zhamu, Centerville, OH (US); Bor Z. Jang, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 815 days.

(21) Appl. No.: 12/001,981

(22) Filed: Dec. 14, 2007

(65) Prior Publication Data
US 2009/0155676 A1    Jun. 18, 2009

(51) Int. Cl.
| | |
|---|---|
| H01M 2/14 | (2006.01) |
| H01M 10/00 | (2006.01) |
| H01M 10/02 | (2006.01) |
| H01M 10/052 | (2010.01) |
| H01M 2/16 | (2006.01) |
| H01M 10/42 | (2006.01) |

(52) U.S. Cl.
CPC ......... *H01M 10/052* (2013.01); *H01M 2/166* (2013.01); *H01M 2/1673* (2013.01); *H01M 10/4235* (2013.01); *Y02E 60/122* (2013.01); *Y02T 10/7011* (2013.01)

(58) Field of Classification Search
CPC ........ H01M 2/14; H01M 10/00; H01M 10/02; C01B 33/12; C01G 23/047; C01F 7/02
USPC ............................ 429/247–249, 231.95, 251
See application file for complete search history.

(56) References Cited

U.S. PATENT DOCUMENTS

| | | |
|---|---|---|
| 4,812,375 A | 3/1989 | Foster |
| 5,006,428 A | 4/1991 | Goebel et al. |
| 5,427,872 A | 6/1995 | Shen et al. |
| 5,434,021 A | 7/1995 | Fauteux et al. |
| 5,536,599 A | 7/1996 | Alamgir et al. |
| 5,648,187 A | 7/1997 | Skotheim |
| 5,824,434 A | 10/1998 | Kawakami et al. |
| 5,961,672 A | 10/1999 | Skotheim |
| 6,017,651 A | 1/2000 | Nimon et al. |
| 6,025,094 A | 2/2000 | Visco et al. |
| 6,165,644 A | 12/2000 | Nimon et al. |
| 6,194,098 B1 | 2/2001 | Ying et al. |

(Continued)

OTHER PUBLICATIONS

Machine translation of Gosho (JP2002-305026).*

(Continued)

*Primary Examiner* — Jun Li

(57) ABSTRACT

The present invention provides a battery cell, comprising: (a) an anode comprising an active metal or a metal ion storage material (e.g., an intercalation compound that accommodates lithium ion); (b) a cathode structure; and (c) an ionically conductive protective layer on a surface of the anode and interposed between the anode and the cathode structure. This protective layer comprises a porous membrane having pores therein and a soft matter phase disposed in at least one of the pores, wherein the soft matter phase comprises oxide particles dispersed in a non-aqueous alkali, alkaline, or transition metal salt solution. Most preferably, this battery cell is a lithium metal secondary cell that is essentially free from dendrite and exhibits a safer and more stable cycling behavior. Such a high-capacity rechargeable battery is particularly useful for powering portable electronic devices and electric vehicles.

18 Claims, 5 Drawing Sheets

(56) References Cited

U.S. PATENT DOCUMENTS

| | | | |
|---|---|---|---|
| 6,225,002 B1 | 5/2001 | Nimon et al. | |
| 6,395,423 B1 | 5/2002 | Kawakami et al. | |
| 6,432,586 B1 | 8/2002 | Zhang | |
| 6,537,701 B1 | 3/2003 | Nimon et al. | |
| 6,596,432 B2 | 7/2003 | Kawakami et al. | |
| 6,733,924 B1 | 5/2004 | Skotheim et al. | |
| 6,797,428 B1 | 9/2004 | Skotheim et al. | |
| 6,803,152 B2 | 10/2004 | Shembel et al. | |
| 6,936,381 B2 | 8/2005 | Skotheim et al. | |
| 7,244,531 B2 | 7/2007 | Kim et al. | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 2005/0031941 A1* | 2/2005 | Zhang et al. | 429/142 |
| 2006/0057464 A1* | 3/2006 | Kim | B01D 67/0011 |
| | | | 429/306 |

OTHER PUBLICATIONS

U.S. Appl. No. 10/919,959, filed Aug. 6, 2004, A. J. Bhattacharyya, et al.

A. J. Bhattacharyya, et al, New Class of Soft Matter Electrolytes Obtained via Heter Doping: Percolation Effects in "Soggy Sand" Solid State Ionics,177 (2006) 2565-2568.

S. Das and A J. Bhattacharyya, "Oxide Particle Surface Chemistry and Ion Transport in "Soggy Sand" Electrolytes," J. Phys. Chem. C 2009, 113, 6699-6705.

* cited by examiner

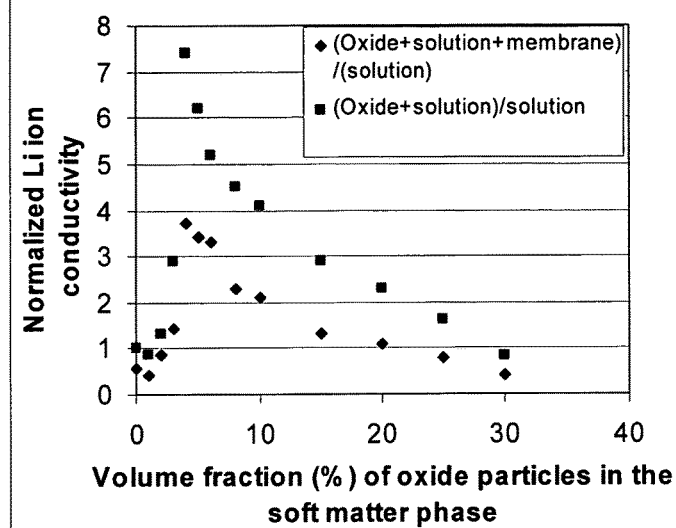

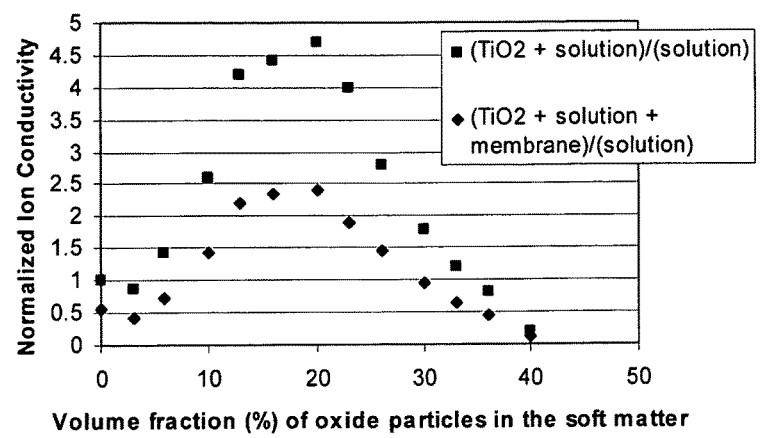

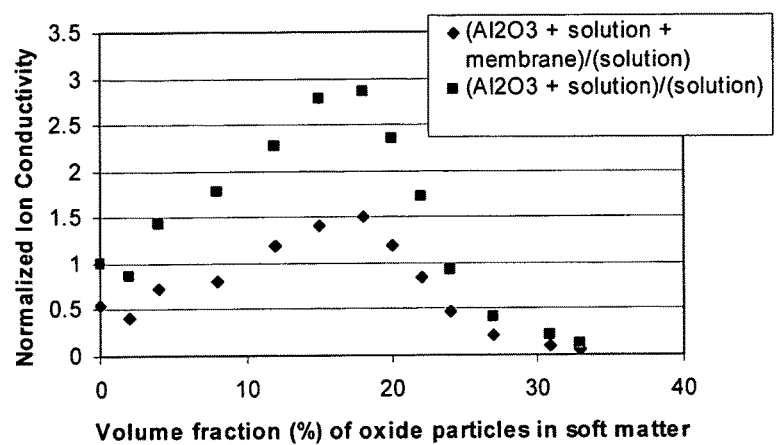

ANODE PROTECTIVE LAYER COMPOSITIONS FOR LITHIUM METAL BATTERIES

FIELD OF THE INVENTION

The present invention provides a nano-structured anode protective layer material in a secondary battery, particularly lithium metal battery.

BACKGROUND

The description of prior art will be primarily based on the list of references presented at the end of this section.

Lithium-ion and lithium (Li) metal batteries are considered promising power sources for electric vehicle (EV), hybrid electric vehicle (HEV), and portable electronic devices, such as lap-top computers and mobile phones. Lithium metal has the highest capacity compared to any other metal or metal-intercalated compound as an anode material. Hence, Li metal batteries have a significantly higher energy density and power density than lithium ion batteries. However, cycling stability and safety concerns remain the primary factors preventing the wide-scale commercialization of Li metal batteries for EV, HEV, and microelectronic device applications. Specific cyclic stability and safety issues of lithium metal rechargeable batteries are primarily related to the high tendency for Li to form dendrite structures during repeated charge-discharge cycles or an overcharge, leading to internal electrical shorting and thermal runaway.

Many attempts have been made to address the dendrite-related issues, as summarized below:

Foster [Ref. 1] proposed a multilayer separator that included a porous membrane and an electro-active polymeric material contained within the separator materials. The polymer is capable of reacting with any lithium dendrite that might penetrate the separator, thus preventing the growth of dendrites from the anode to cathode that otherwise would cause internal shorting.

In a technically similar fashion, Shen, et al. [Ref. 2], used a non-reactive first porous separator (e.g., porous polypropylene) adjacent to the lithium anode and a second fluoro-polymer separator between the cathode and the first separator. The second separator (e.g., polytetrafluoro ethylene) is reactive with lithium. As the tip of a lithium dendrite comes into contact with the second separator, an exothermic reaction occurs locally between the lithium dendrite and the fluoro-polymer separator, resulting in the prevention of the dendrite propagation to the cathode.

Goebel, et al. [Ref. 3], proposed a "getter" electrode positioned between the anode and the cathode and was separated from the cathode and anode by fiberglass paper separators. The getter layer, composed of carbon or graphite material disposed on surfaces of these separators, serves as a low-capacity cathode that quickly discharges any Li dendrite that comes in contact with the getter layer.

Fauteux, et al. [Ref. 4], applied to a metal anode a surface layer (e.g., polynuclear aromatic and polyethylene oxide) that enables transfer of metal ions from the metal anode to the electrolyte and back. The surface layer is also electronically conductive so that the ions will be uniformly attracted back onto the metal anode during electrodeposition.

Alamgir, et al. [Ref. 5], used ferrocenes to prevent chemical overcharge and dendrite formation in a solid polymer electrolyte-based rechargeable battery.

Kawakami, et al. [Ref. 6], observed that internal shorting could be prevented by using a multi-layered metal oxide film as a separator with small apertures through which lithium ions can pass and the growth of dendrites can be inhibited. Kawakami, et al. [Ref. 7], further suggested a first thin film coating on the anode and a second thin film coating on the cathode, with both coatings permeable to lithium ions, could be effective in preventing dendrite formation. The first film can contain a large ring compound, an aromatic hydrocarbon, a fluoro-polymer, a glassy metal oxide, a cross-linked polymer, or a conductive powder dispersion. However, the dendrite-preventing mechanisms of these films were not clearly explained. Kawakami, et al. [Ref. 8], also found that some size mismatch between the anode and the cathode (with the anode being larger) seems to be effective in preventing dendrite formation.

Zhang [Ref. 9] disclosed a separator that is composed of a ceramic composite layer (to block dendrite growth) and a polymer micro-porous layer (to block ionic flow between the anode and cathode in the event of a thermal runaway).

Skotheim [Ref. 10] provided a Li metal anode that was stabilized against dendrite formation by the use of a vacuum-evaporated thin film of a Li ion-conducting polymer interposed between the Li metal anode and the electrolyte. Ying, et al. [Ref. 11], proposed a separator that comprises a microporous pseudo-boehmite layer and a polymer-based protective coating layer. It was speculated that this separator had a small pore structure (10 µm or less) and sufficient mechanical strength to prevent the Li dendrite from contacting the cathode and causing internal shorting. Skotheim, et al. [Ref. 12], proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode active material, consisting of at least 3 or 4 layers, is too complex and too costly to make.

Protective coatings for Li anodes, such as glassy surface layers of $LiI-Li_3PO_4-P_2S_5$, may be obtained from plasma assisted deposition [Ref. 17]. Complex, multi-layer protective coatings were also proposed by Visco, et al. [Ref. 18].

Organic additives that were used to stabilize the lithium anode active surface include (a) an organosilicon backbone with pyridinium groups bound to the backbone [Ref. 13], (b) halogenated organic metal salts [Ref. 14], and (c) dioxolane [Ref. 15]. Nimon, et al. [Ref. 16], developed methods and reagents for enhancing the cycling efficiency of lithium polymer batteries. The methods entailed forming a protective layer (e.g., $LiAlCl_4.3SO_4$ and $Al_2S_3$) on the lithium metal anode surface through a reaction of electrolyte species with lithium metal.

Despite these earlier efforts, no rechargeable Li metal batteries have yet succeeded in the market place. This is likely due to the notion that these prior art approaches have major deficiencies. For instance, in several cases, the anode or electrolyte structures are too complex. In others, the materials are too costly or the processes are too laborious or difficult. Clearly, an urgent need exists for a simpler, more cost-effective, and easier to implement approach to preventing Li metal dendrite-induced internal short circuit and thermal runaway problems in Li metal batteries and other rechargeable batteries.

LIST OF REFERENCES

1. D. L. Foster, "Separator for lithium batteries and lithium batteries including the separator," U.S. Pat. No. 4,812,375, Mar. 14, 1989.

2. D. H. Shen, et al. "Dendrite preventing separator for secondary lithium batteries," U.S. Pat. No. 5,427,872, Jun. 27, 1995.
3. F. Goebel, et al., "Getter Electrodes and Improved Electrochemical Cell Containing the Same," U.S. Pat. No. 5,006,428 (Apr. 9, 1991).
4. D. Fauteux, et al., "Secondary Electrolytic Cell and Electrolytic Process," U.S. Pat. No. 5,434,021 (Jul. 18, 1995).
5. M. Alamgir, et al. "Solid polymer electrolyte batteries containing metallocenes," U.S. Pat. No. 5,536,599, Jul. 16, 1996.
6. S. Kawakami, et al., "Secondary batteries," U.S. Pat. No. 5,824,434, Oct. 20, 1998.
7. S. Kawakami, et al., "High energy density secondary battery for repeated use," U.S. Pat. No. 6,395,423, May 28, 2000.
8. S. Kawakami, et al., "Rechargeable batteries," U.S. Pat. No. 6,596,432, Jul. 22, 2003.
9. Z. Zhang, "Separator for a high energy rechargeable lithium battery," U.S. Pat. No. 6,432,586, Aug. 13, 2002.
10. T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999).
11. Q. Ying, et al., "Protective Coating for Separators for Electrochemical Cells," U.S. Pat. No. 6,194,098 (Feb. 27, 2001).
12. T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007).
13. E. M. Shembel, et al., "Non-aqueous Electrolytes Based on Organosilicon Ammonium Derivatives for High-Energy Power Sources," U.S. Pat. No. 6,803,152 (Oct. 12, 2004).
14. H. Kim, et al., "Non-aqueous Electrolyte and Lithium Battery Using the Same," U.S. Pat. No. 7,244,531 (Jul. 17, 2007).
15. Y. S. Nimon, et al., "Dioxolane as a Protector for Lithium Electrodes," U.S. Pat. No. 6,225,002 (May 1, 2001).
16. Y. S. Nimon, et al., "Methods and Reagents for Enhancing the Cycling Efficiency of Lithium Polymer Batteries," U.S. Pat. No. 6,017,651 (Jan. 25, 2000); U.S. Pat. No. 6,165,644 (Dec. 26, 2000); and U.S. Pat. No. 6,537,701 (Mar. 25, 2003).
17. S. J. Visco, et al., "Protective Coatings for Negative Electrodes," U.S. Pat. No. 6,025,094 (Feb. 15, 2000).
18. S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007).
19. A. J. Bhattacharyya, J. Maier, R. Bock, and F. F. Lange, "New Class of Soft Matter Electrolytes Obtained via Heterogeneous Doping: Percolation Effects in "Soggy Sand" Electrolytes," Solid State Ionics, 177 (2006) 2565-2568.
20. A. J. Bhattacharyya and J. Maier, "Non-aqueous Electrolyte for Use in a Battery," U.S. patent application Ser. No. 10/919,959 (Aug. 6, 2004).

SUMMARY OF THE INVENTION

The present invention provides a battery cell with a safe, long, and stable cycle life. In particular, this is a secondary or rechargeable battery based on a metal anode or an anode that is capable of absorbing and extracting metal ions (e.g., Li ions). The battery cell comprises: (a) an anode comprising an active metal or a metal ion storage material (e.g., a metal intercalation compound); (b) a cathode structure; and (c) an ionically conductive protective layer on a surface of the anode and interposed between the anode and the cathode structure. This protective layer comprises a porous membrane having pores therein and a soft matter phase disposed in at least one of the pores, wherein the soft matter phase comprises oxide particles dispersed in a non-aqueous alkali, alkaline, or transition metal salt solution.

For the cases of Li metal or Li ion batteries, preferably, the oxide particles are selected from $SiO_2$, $TiO_2$, $Al_2O_3$, MgO, or a combination thereof. The oxide particles preferably have a size smaller than 500 nm, more preferably smaller than 100 nm, and further preferably smaller than 50 nm. The oxide particles have a volume fraction preferably in the range of 2% to 80% based on the total volume of the oxide particles and the lithium salt solution, but more preferably in the range of 5% to 40%.

The pores occupy a volume fraction of the porous membrane in the range of 20% to 95% inclusive, but preferably in the range of 50% to 85% inclusive. The pores have a size preferably smaller than 10 μm, but more preferably smaller than 2 μm.

For a Li metal or Li ion battery, the non-aqueous salt solution comprises a lithium salt solution, preferably a non-aqueous salt solution comprising a solvent selected from the group consisting of EC, PC, DEC, DMC, EMC, THF, 2MeTHF, 1,2-DME or higher glymes, sufolane, methyl formate, methyl acetate, and combinations thereof, and a supporting salt selected from the group consisting of $LiPF_6$, $LiBF_4$, $LiAsF_6$, $LiClO_4$, $Li\ CF_3SO_3$, $LiN(CF_3SO_2)_2$, and $LiN(SO_2C_2F_5)_2$. For a zinc- or aluminum-based battery cell, the salt solution comprises a zinc or aluminum salt solution.

In one preferred embodiment, the battery cell further comprises a separator or electrolyte layer disposed between the conductive protective layer and the cathode structure. In another preferred embodiment, the conductive protective layer itself also serves as a separator/electrolyte layer disposed between the anode and the cathode structure.

BRIEF DESCRIPTION OF THE DRAWINGS

FIG. 3 Li ion conductivity of a protective layer (containing $SiO_2$ nano particles and a Li salt solution embedded in a porous membrane) and that of a corresponding soft matter phase (no membrane) each normalized with respect to the conductivity of a corresponding Li salt solution (without oxide nano particles and not being constrained by pores of a membrane).
FIG. 4 Li ion conductivity of a protective layer. (containing $TiO_2$ nano particles and a Li salt solution embedded in a porous membrane) and that of a corresponding soft matter phase (no membrane) each normalized with respect to the conductivity of a corresponding Li salt solution (without oxide nano particles and not being constrained by pores of a membrane).

FIG. 5 Li ion conductivity of a protective layer (containing $Al_2O_3$ Particles and a Li salt solution embedded in a porous membrane) and that of a corresponding soft matter phase (no membrane) each normalized with respect to the conductivity of a corresponding Li salt solution (without oxide nano particles and not being constrained by pores of a membrane).

DETAILED DESCRIPTION OF PREFERRED EMBODIMENTS

This invention is related to anode materials for high-capacity secondary batteries, which are preferably secondary lithium metal batteries based on a non-aqueous electrolyte or a polymer gel electrolyte. The shape of a lithium secondary battery can be cylindrical, square, button-like, etc. The present invention is not limited to any battery shape or configuration.

Figure 1:
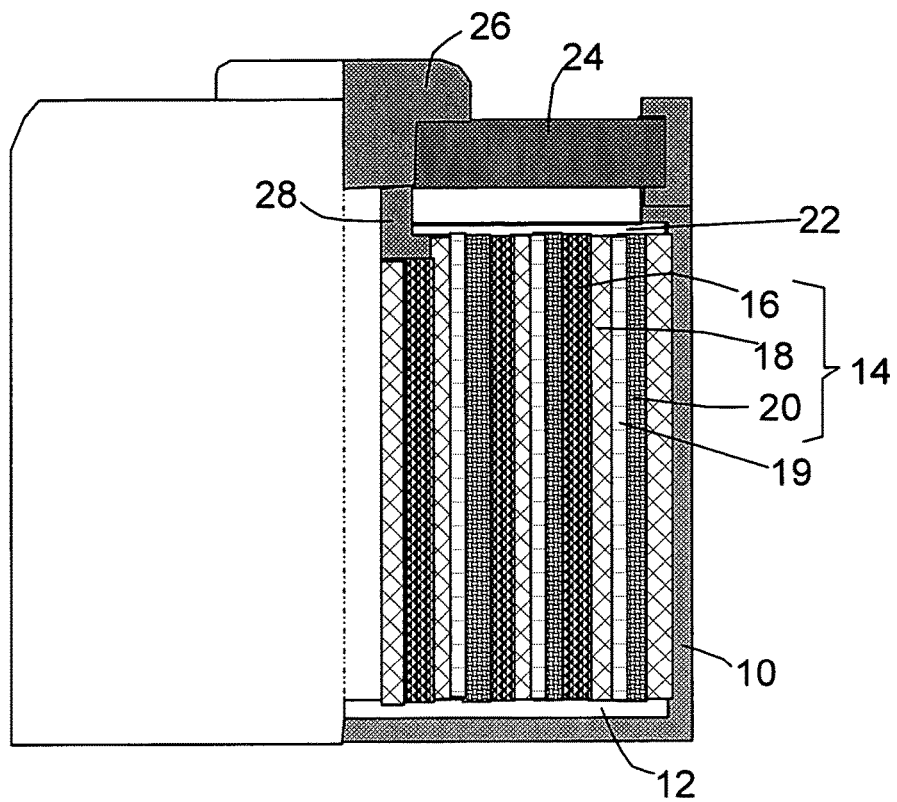
FIG. 1 Schematic of a cylinder-shape lithium ion battery.

As an example, a cylindrical battery configuration is shown in FIG. 1 for the illustration purpose. A cylindrical case 10 made of stainless steel has, at the bottom thereof, an insulating body 12. An assembly 14 of electrodes is housed in the cylindrical case 10 such that a strip-like laminate body, comprising a positive electrode (cathode) 16, a separator 18 (comprising electrolyte), an anode protection layer 19 of the present invention, and a negative electrode (anode) 20 stacked in this order, is spirally wound with a separator being disposed at the outermost side of the electrode assembly 14. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

Figure 2:
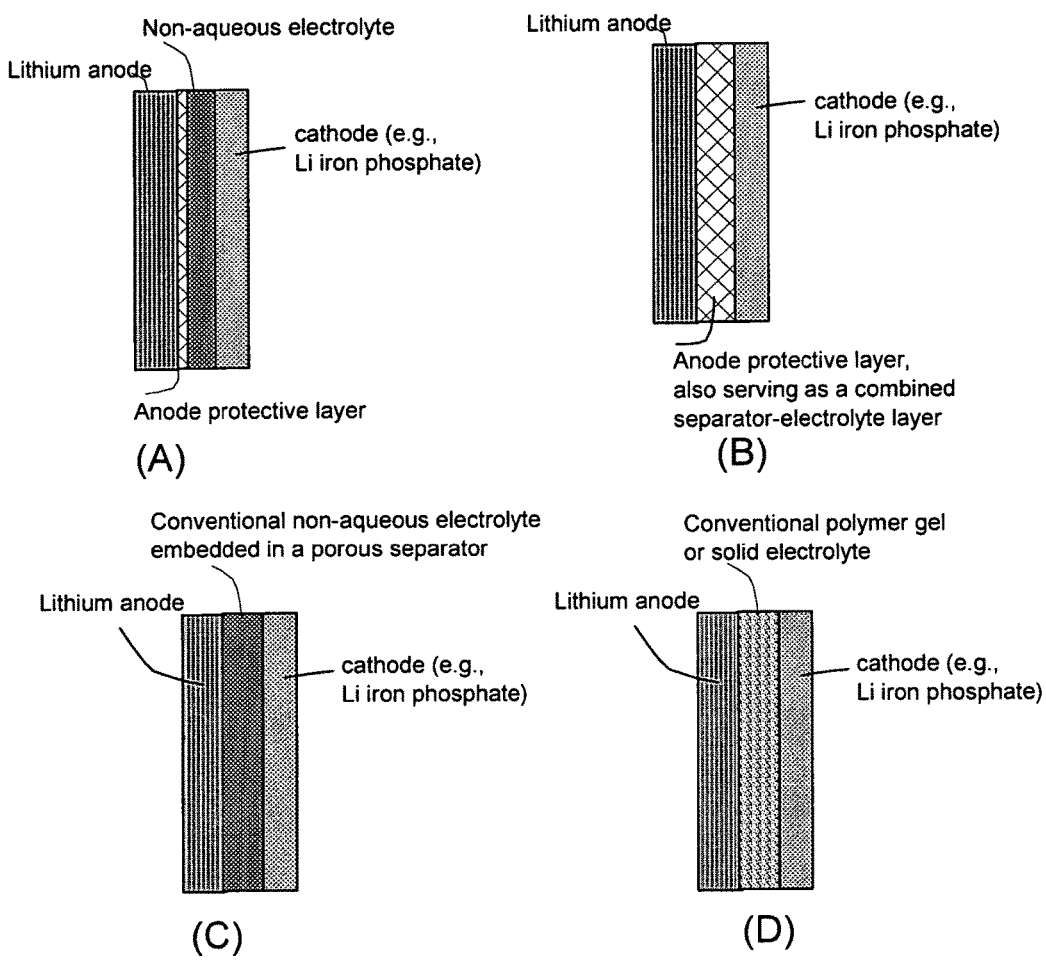
FIG. 2 (A) a battery cell having an anode protective layer and a separate electrolyte-separator layer according to one of the preferred embodiments of the present invention; (B) a battery cell having an anode protective layer which is also an electrolyte-separator layer according to another preferred embodiment of the present invention; (C) a prior art battery cell comprising a conventional electrolyte-separator layer (e.g., solution of $LiPF_6$ and EC-DEC solvent embedded in a porous membrane such as Celgard 2500); and (D) another prior art battery cell comprising a conventional polymer gel or solid electrolyte layer interposed between a Li metal anode or Li ion anode and a cathode layer.

The dendrite formation issue is addressed by employing a stable and dendrite-preventing interfacial or protective layer interposed between a lithium metal anode and an electrolyte layer (e.g., FIG. 2(A)). In another preferred embodiment of the present invention, the protective layer is disposed between a lithium metal anode and a cathode structure if this protective layer is also the separator/electrolyte layer (FIG. 2(B)). In both cases, the protective layer or combined protective/electrolyte layer of the present invention were surprisingly found to be very effective in suppressing dendrite formation. The protective layer preferably has the following general features:

(a) The protective layer includes a mechanically strong but porous framework or membrane containing micron- or sub-micron-sized pores to accommodate a so-called "soggy sand" soft matter phase;
(b) The soft matter phase is preferably composed of nano-scaled, inorganic oxide particles (e.g., $SiO_2$, $TiO_2$, MgO, and $Al_2O_3$) dispersed in a non-aqueous lithium salt solution, e.g., $LiPF_6$ in a liquid mixture of ethylene carbonate (EC) and dimethyl carbonate (DMC). The oxide particles are preferably acidic in nature, and are preferably smaller than 500 nm in size and further preferably smaller than 100 nm in size;
(c) The soft matter phase, in contact with the lithium metal anode, allows lithium ions to permeate in and out of the anode during the charging and discharging procedures of the battery cell. This soft matter, when held in place in minute pores of a mechanically strong framework or membrane, appears to be capable of stopping the penetration of a dendrite;
(d) Preferably, the volume fraction of the pores in this membrane is between 20% and 95%, but is preferably between approximately 50% and 85% (inclusive). The pore size is preferably smaller than 10 μm, further preferably smaller than 5 μm, and most preferably smaller than 2 μm; and
(e) By contrast, the conventional battery cells as schematically shown in FIG. 2(C) and FIG. 2(D), have the drawbacks that, in both cases, the separator-electrolyte layer has a very low ion conductivity (typically much lower than $10^{-3}$ S/cm) and is not capable of stopping dendrite penetration.

It may be noted that similar soft matters alone (without a porous membrane as herein described) have been used as an electrolyte [Ref. 19, 20] due to their high ionic conductivity, but not an anode protective layer material. As demonstrated in [19], the Li ion conductivity of the soft matter phase can be several-fold higher than that of the lithium salt solution alone (without the oxide nano particles). However, this enhancement in Li ion conductivity was observed only in the situations where the oxide particle volume fraction was lower than 40%, and more typically lower than 30%. Our study results demonstrate that such a low oxide volume fraction makes the resulting soft matter phase too soft to stop penetration of a Li dendrite.

This drawback can be overcome by incorporating the ion-conducting soft matter in the interconnected pores of a porous, but rigid or strong framework (or membrane) to form a protective layer interposed between a Li metal anode and an electrolyte layer, or between the Li metal anode and a cathode structure. The pore volume fraction in the membrane can be between approximately 20% and 95%, but preferably be greater than 50% to ensure complete pore interconnectivity (and, hence, Li ion path continuity), but less than 85% to ensure an adequate pore wall rigidity and strength. The membrane with interconnected pores can be prepared from an open-cell foamed plastic, an aerogel, a glass fabric, or a resin-bonded fiber aggregate (e.g., a non-woven mat or paper), just to name a few. The material type used for this porous membrane does not appear to be a critical factor. The morphology or structure of pores and pore size appear to be more important. Although an interconnected pore structure is preferred, the membrane may simply contain through-thickness holes, from one end (facing the metal anode side) to the other end (facing a separator layer or cathode structure). In all cases, the preferred pore size is smaller than 10 μm, and more preferably smaller than 5 μm. These pores or holes, containing therein a soft matter phase, were found to be most effective in blocking the penetration of a Li dendrite. By contrast, the conventional soft matter phase-based electrolytes, as suggested by Bhattacharyya, et al. [19, 20], were found to be ineffective in suppressing dendrite propagation.

Our study results (FIG. 3) show that, by impregnating a rigid, porous membrane (e.g., approximately 60% porosity level and pore diameter of 3 μm) with a soft matter phase, the resulting protective layer can still exhibit a Li ion conductivity higher than that of a corresponding lithium salt solution alone if the volume fraction of silicon oxide nano particles is within a certain range (e.g., 4-20% of $SiO_2$ particles 40 nm in diameter). A Li ion conductivity as high as $5\times10^{-2}$ S/cm can be achieved with the presently developed protective layer. As a point of reference, most of non-aqueous or polymer electrolytes exhibit a Li ion conductivity in the range of $10^{-5}$ S/cm-$10^{-3}$ S/cm. This is a highly surprising result even to those who are highly skilled in the art. With such a high Li ion conductivity, this protective layer can be used as an electrolyte/separator layer interposed between a Li anode and a cathode. Again, the ability of such a combined anode protective layer and separator/electrolyte layer to stop dendrite penetration, yet maintain a high ion conductivity, has not been recognized in the prior art.

The preferred sub-micron or nano-scaled oxide particles to be included in a soft matter phase are $SiO_2$, $TiO_2$, MgO, $Al_2O_3$, and a combination thereof. As indicated earlier, the Li ion conductivity of a soft matter phase can be several-fold higher than that of its lithium salt solution alone (without the oxide nano particles). In a non-aqueous solution, with a low dielectric constant, cations and anions tend to get paired up, leading to a low conductivity. Many oxide particles with a proper surface structure and energetics are capable of dissociating the ion pairs. Anions or cations can be adsorbed on the surface of oxide fillers leading to a very high concentration of their counter-ions in the vicinity of the oxide, forming a space charge layer. In a lithium-ion solution, acidic nano-scale oxides, such as $SiO_2$, exhibited a much higher conductivity (compared to basic oxides) due to their effectiveness in trapping the anions at the surface, giving rise to more free Li ions.

Not to be construed as limiting the scope of our application, it is believed that an important feature in the observed variations of conductivity with the oxide volume fraction is related to the percolation behavior of a composite system in which fast ion conduction occurs predominantly through interface zones. With increasing oxide volume fraction, the ion conductivity is increased. At a critical oxide volume fraction (the first percolation threshold), a network of interconnected ion-conducting pathways is formed, resulting in a drastic increase in ion conductivity. It is speculated that, with a further increase in the oxide volume fraction, the conductivity reaches a peak, beyond which the conductivity begins to decrease. At a second critical volume fraction, perhaps a second percolation threshold is reached, where blockage of percolating pathways by insulator particles occur. Consequently, the enhancement in Li ion conductivity using non-conductive fillers was observed only in the cases where the oxide particle volume fraction was lower than 40%, and more typically, lower than 30%. Such a low oxide volume fraction makes the resulting soft matter phase too soft to stop permeation of a Li dendrite. We proceeded to overcome this drawback by impregnating the soft matter phase in the pores of a rigid membrane. The pore size is chosen to reduce or eliminate the possibility of a dendrite penetrating through the pores. The presence of the fine oxide particles in these pores further reduces the effective size of the pores, practically eliminating the permeation of dendrite through these holes.

Thus, in one preferred embodiment of the present invention, the aforementioned anode protective layer is in ionic contact with a separator/electrolyte layer, which can be either (1) a non-aqueous electrolyte supported by a porous separator (e.g., a fluoro-polymer membrane), or (2) a soft matter of the same or different composition as the protective layer defined above. The fluoro-polymer is capable of reacting with a lithium dendrite structure that might accidentally penetrate through the interfacial layer. Such a reaction disrupts the propagation of a dendrite. The components of the aforementioned soft matter phase, when used as an electrolyte material, are relatively inert with respect to Li ions.

The anode material may comprise an active metal or a metal ion storage material (such as graphite, Si, a combined graphite-carbon material) that can accommodate Li ions through intercalation, insertion, or adsorption, etc. The active metal may be highly reactive in ambient conditions and can benefit from a protective layer. The active metals are generally alkali metals (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A most preferred active metal electrode is composed of lithium.

Although Li metal secondary batteries provide much higher energy density compared with Li ion batteries, commercial use of these Li metal cells, particularly for plug-in hybrid electric vehicles (PHEVs) or hybrid electric vehicle (HEV) applications, remains limited primarily due to poor cycling stability and safety concerns. The invented protective layer technology significantly improves the safety and cycling stability of Li metal batteries by suppressing Li dendrite propagation.

The porous membrane is impregnated with the "soft matter phase," which is a mixture of oxide particles and a liquid electrolyte comprising a lithium salt dissolved in a solvent, such as ethylene carbonate (EC), propylene carbonate (PC), 1,2-dimethoxy ethane (DME), 1,3-dioxolane (DIOX), or various ethers, glymes, lactones, sulfones, sulfolane, or mixtures thereof. The electrolytic salts (in the case of Li metal anode, for instance) to be incorporated into a non-aqueous electrolyte solvent may be selected from a lithium salt, such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$], and $LiN(SO_2C_2F_5)_2$. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Optionally, an additional protective layer may be disposed onto the cathode and in ionic contact with both the cathode and the electrolyte layer. This layer is again designed to be impermeable to incipient lithium dendrite species, but permeable to lithium ions.

The positive electrode (cathode) active materials are well-known in the art. The positive electrode 16 (FIG. 1) can be manufactured by the steps of (a) mixing a positive electrode active material with a conductor agent (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium vanadium phosphate because these oxides provide a high cell voltage and good cycling stability.

Acetylene black, carbon black, ultra-fine graphite particles, or nano-scaled graphene platelets (NGPs) may be used as a conductor agent in the cathode. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

Although the presently invented anode protective layer has been discussed using Li metal anode as a primary example, the scope of the present invention is not limited to Li metal anode-based secondary batteries. The anode metal may be selected from alkali, alkaline, and transition metals, etc. Zinc (Zn) or aluminum (Al) can be used as an anode metal in a metal-air cell or Zn metal secondary battery.

The anode protective layer may also be used in a Li ion battery, in which the anode active material may be selected from graphite, carbon-coated graphite, meso-carbon microbead (MCMB), spheroidal graphite, or a combination thereof. The spheroidal graphite, produced by spheroidizing natural graphite flakes using a special thermo-chemical procedure, is available from several commercial sources (e.g., Huadong Graphite Co., Pingdu, China). The spheroidal graphite has a basically identical crystalline structure as in natural graphite, having relatively well-ordered crystallites with an interplanar spacing of 0.336 nm. The MCMB is obtained by extracting meso-phase particles out of other less-ordered carbon matrix and then graphitizing the meso-phase particles. They are typically supplied as a highly graphitic form of graphite. Commercial sources of MCMBs include Osaka Gas Company, Japan, China Steel Chemical Co., Taiwan, and Shanghai Shanshan Technology Co., China. The anode active material in the present invention may also be selected from the following groups of materials (which are all capable of absorbing and extracting Li ions):

(1) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) or micron- or nanometer-sized particulate form. The coating is preferably thinner than 10 μm and more preferably thinner than 1 μm; This group of material was chosen for our studies due to the notion that their theoretical capacity is significantly higher than that of graphite alone: $Li_{4.4}Si$ (3,829-4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

(2) The alloys or intermetallic compounds of Si, Ge, Sn, Pb, Sb, Bi, Zn, Al, or Cd, stoichiometric or non-stoichiometric, with other elements;

(3) The oxides, carbides, nitrides, sulfides, phosphides, selenides, tellurides, pnictides, or their mixtures (e.g., co-oxides or composite oxides) of Si, Ge, Sn, Pb, Sb, Bi, Zn, Al, Fe, or Cd.

(4) Salts or hydroxides of Sn, e.g., $SnSO_4$ (600 mAh/g), $Sn_2PO_4Cl$, (300 mAh/g even after 40 cycles), and $Sn_3O_2(OH)_2$ (300 mAh/g).

A wide range of electrolytes can be used as part of a separate electrolyte/separator layer interposed between an anode protective layer and a cathode. Most preferred are non-aqueous electrolytes, although polymer gel electrolytes and other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when a second solvent is employed, the aforementioned ethylene carbonate can be easily and selectively solvated with lithium ion, so that the reduction reaction of the second solvent with the carbonaceous material well developed in graphitization is assumed to be suppressed. Further, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), gamma-butyrolactone (gamma-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps (centipoises) or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

It may be noted that the presently invented anode protective layer approach can be used in a battery comprising a cell unit or a multiplicity of cells connected in series, in parallel, or both. One may choose to implement an anode protective layer on every anode in the multi-cell battery.

EXAMPLES

Unless otherwise noted, the cathode of a lithium metal or Li ion battery was prepared in the following way. First, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 µm) serving as a current collector. The resulting two-layer aluminum foil-active material configuration was then hot-pressed to obtain a positive electrode. In the case of a Li ion anode, the graphite particles were glued together with a polyvinylidene fluoride (PVDF) binder.

A positive electrode (cathode structure), a separator composed of a porous polyethylene film, an anode protective layer, and a negative electrode (anode) were stacked in this order. The stacked body was spirally wound with a separator layer being disposed at the outermost side to obtain an electrode assembly as schematically shown in FIG. 1. Unless otherwise specified in an individual example, the electrolyte used in the present study was prepared as follows: Hexa-fluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

Example 1 (Samples 1, 2, and 3 & 1a, 2a, and 3a)

Soft matter phase materials for Samples 1, 2, and 3, were prepared by mixing fine oxide particles, $SiO_2$ (with an average diameter of 23 nm), $TiO_2$ (95 nm), and $Al_2O_3$ (285 nm), respectively, with a Li salt solution. For Samples 1, 2, and 3, the non-aqueous lithium salt solution was prepared by dissolving $LiPF_6$, $LiClO_4$, and $LiCF_3SO_3$, respectively, in a mixture of ethylene carbonate (EC) and dimethyl carbonate (DMC) at a 1:1 volume ratio. For the preparation of all soft matter phases, oxides were preheated to 300° C. for 24 hours to eliminate potential effects due to physically adsorbed water. Conductivity was measured using AC impedance spectroscopy (frequency range: 1-107 Hz; amplitude of oscillating voltage: 0.1 V) by sandwiching the electrolyte between stainless steel electrodes in a custom-made cell. All preparation and loading of samples into cells for conductivity measurements were conducted in a glove box under a pure Argon atmosphere with a moisture content of ≤1 ppm. The acidity of the oxides was judged on the basis of pH of zero charge (pzc) in an aqueous solution taken from open literature ($SiO_2$: pzc ~3; $TiO_2$: pzc ~5 and $Al_2O_3$: pzc ~8.5).

A wide array of plastic and ceramic membranes of various pore sizes and porosity levels are commercially available. The processes for producing these membranes are well-known in the art. The membranes used in preparing an anode protective layer for Examples 1a-3a were polyethylene-based porous structures with an average pore size of approximately 1.2 µm, 3.8 µm, and 8.7 µm, respectively.

The soft matter phase materials containing $SiO_2$, $TiO_2$, and $Al_2O_3$, respectively (Samples 1-3), were used to separately impregnate the pores in their respective membranes via simple dipping in a protective Argon atmosphere. The resulting soft matter-impregnated membranes are referred to as Samples 1a-3a.

The Li ion conductivity of an intended protective layer (Sample 1a, consisting of a porous membrane impregnated with a $SiO_2$-based soft matter phase) and that of a corresponding soft matter phase (Sample 1) are shown in FIG. 3. The conductivity data, divided by the conductivity of a corresponding 1 mol/L Li salt solution (no oxide and no membrane), were plotted as a function of the oxide volume fraction in a soft matter phase. It is of interest to note that the soft matter phase (oxide particles mixed with a Li salt solution) has a much higher Li ion conductivity compared with the Li salt solution alone, which is characteristic of an oxide-containing soft matter phase. Most surprisingly, however, the presence of a porous membrane with a porosity level of approximately 60% did not cause the conductivity of the resulting layer to drop below that of a corresponding Li salt solution, if the volume fraction of oxide particles lies between 3% and 20% (the ion conductivity being typically in the range of $5\times10^{-3}$ S/cm-$5\times10^{-2}$ S/cm). This is especially surprising if we consider that the membrane itself has a 40% solid content and the pores are filled with a soft matter containing 20% solid oxide particles and dissolved Li salt, resulting in a total solid content in the protective layer higher than 50%. A soft matter phase containing 50% by volume of oxide particles would have exhibited an extremely low ion conductivity, according to what was observed by A. J. Bhattacharyya, et al [Ref. 19]. Additionally, by contrast, a conventional electrolyte layer consisting of an electrolyte solution embedded in a commercially available separator normally exhibits an extremely low Li ion conductivity, typically lower than $10^{-3}$ S/cm. Furthermore, most of the prior art membrane-electrolyte layers are incapable of stopping dendrite penetration.

Similar observations can be made with Samples 2a (with a membrane) and Sample 2 (without a membrane), as indicated in FIG. 4 for $TiO_2$-based soft matter phase materials. The same conclusions can also be drawn with Samples 3a (with a membrane) and Sample 3 (without a membrane), as indicated in FIG. 5 for $Al_2O_3$-based soft matter phase materials.

Comparative Example 1 (Samples 1b, 2b, and 3b)

For Samples 1b, 2b, and 3b, the non-aqueous lithium salt solution was prepared by dissolving $LiPF_6$, $LiClO_4$, and $LiCF_3SO_3$, respectively, in a mixture of ethylene carbonate (EC) and dimethyl carbonate (DMC) at a 1:1 volume ratio. In each sample, a commercially available membrane (Celgard 2500) was impregnated with the resulting lithium salt solution (without the corresponding oxide particles). The Li ion conductivity of the impregnated membrane, essentially a separator comprising an electrolyte solution, was measured for a comparison purpose. The Li ion conductivity values at room temperature for the solutions of $LiPF_6$, $LiClO_4$, and $LiCF_3SO_3$ in EC/DMC were found to be approximately $11.1 \times 10^{-3}$ S/cm, $5.7 \times 10^{-3}$ S/cm, and $3.1 \times 10^{-3}$ S/cm, respectively. By contrast, the Li ion conductivity values at room temperature for the membranes, soaked with the solutions of $LiPF_6$, $LiClO_4$, and $LiCF_3SO_3$ in EC/DMC, were found to be approximately $0.65 \times 10^{-3}$ S/cm, $0.47 \times 10^{-3}$ S/cm, and $0.32 \times 10^{-3}$ S/cm, respectively.

Example 2

The soft matter phase-impregnated membrane prepared in Sample 1a was incorporated as a protective layer in a lithium metal battery, schematically shown in FIG. 2(A). Approximately 20% by volume of $SiO_2$ particles with an average diameter of 23 nm was dispersed in the $LiPF_6$/EC-DMC solution and impregnated into a membrane of approximately 50 μm thick to form the desired protective layer. An additional separator layer made up of a glass fiber mat of approximately 100 μm thick, soaked with the same electrolyte solution ($LiPF_6$/EC-DMC) but without oxide particle, was disposed between the protective layer and a cathode layer.

Comparative Example 2

A corresponding lithium metal battery, schematically shown in FIG. 2(C), was prepared by interposing a separator-electrolyte layer between a Li foil anode and a cathode. This separator-electrolyte layer was made up of a glass fiber mat of approximately 150 μm in thickness and having pores between fibers of approximately 10-30 μm in size. Again, the fiber mat was soaked with the same electrolyte solution ($LiPF_6$/EC-DMC, without oxide particle) as used in Example 2.

The Li metal batteries of Example 2 and Comparative Example 2 were subjected to repeated charging and discharging. The battery of Comparative Example 2 was found to suffer from internal shorting after 17 cycles. By contrast, after 150 cycles, the battery of Example 2 continues to provide reliable power.

Example 3

The soft matter phase-impregnated membrane prepared in Sample 3a was incorporated as a protective layer, as well as a combined separator-electrolyte layer, in a lithium metal battery, schematically shown in FIG. 2(B). Approximately 20% by volume of $Al_2O_3$ particles with an average diameter of 285 nm was dispersed in the $LiCF_3SO_3$/EC-DMC solution and impregnated into a membrane of approximately 100 μm thick to form the desired protective layer.

Comparative Example 3

A corresponding lithium metal battery, schematically shown in FIG. 2(D), was prepared by interposing a separator-electrolyte layer between a Li foil anode and a cathode. This separator-electrolyte layer was made up of a glass fiber mat of approximately 100 μm in thickness and having pores between fibers of approximately 10-30 μm in size. Again, the fiber mat was soaked with the same electrolyte solution ($LiCF_3SO_3$/EC-DMC, without any oxide particle) as used in Example 3.

The Li metal batteries of Example 3 and Comparative Example 3 were subjected to repeated charging and discharging. The battery of Comparative Example 3 was found to suffer from internal shorting after 16 cycles. By contrast, after 250 cycles, the battery of Example 3 continues to provide reliable power.

Example 4

The soft matter phase-impregnated membrane prepared in Sample 1a was incorporated as a protective layer in a lithium-ion battery, similar to what is schematically shown in FIG. 2(A), but with a graphite-based intercalation compound as the anode (meso-carbon micro beads bonded by a PVDF binder). Approximately 20% by volume of $SiO_2$ particles with an average diameter of 23 nm was dispersed in the $LiPF_6$/EC-DMC solution and impregnated into a membrane of approximately 50 μm thick to form the desired protective layer. An additional separator layer made up of a glass fiber mat of approximately 100 μm thick, soaked with the same electrolyte solution ($LiPF_6$/EC-DMC) but without oxide particle, was disposed between the protective layer and a cathode layer.

Comparative Example 4

A corresponding lithium ion battery, similar to what is schematically shown in FIG. 2(C), was prepared by interposing a separator-electrolyte layer between a MCMB-based anode and a cathode. This separator-electrolyte layer was made up of a glass fiber mat of approximately 150 μm in thickness and having pores between fibers of approximately 10-30 μm in size. Again, the fiber mat was soaked with the same electrolyte solution ($LiPF_6$/EC-DMC, without oxide particle) as used in Example 4.

The Li ion batteries of Example 4 and Comparative Example 4 were subjected to repeated charging and discharging. The reversible capacities of both samples were monitored as a function of the number of cycles. The battery of Comparative Example 4 was found to suffer from a severe irreversibility, from an initial capacity of 305 mAh/g to approximately 220 mAh/g (a reduction of 85 mAh/g) after 100 cycles. By contrast, after 400 cycles, the battery of Example 4 only exhibited a reduction in capacity of approximately 22 mAh/g. Surprisingly, the anode protective layer of the present invention is capable of stabilizing the Li ion anode material.

In summary, the present invention provides an innovative, versatile platform materials technology that enables the design and manufacture of superior anode protective materials for metal or metal ion batteries (e.g., lithium metal or Li ion batteries). This new technology has the following advantages:

(1) This approach is applicable to a wide spectrum of electrochemically active anode materials.
(2) The invented anode protective layer enables the utilization of a Li metal secondary battery that exhibits the highest reversible capacity and a stable cycling behavior. This is a highly beneficial feature for a battery that is intended for high power density applications such as electric cars.
(3) The soft matter anode protective layer has a surprisingly high metal ion conductivity which, in many cases, is even higher than that of a corresponding metal salt solution alone.
(4) The protective layer can also serve as a separator-electrolyte layer in a Li metal or Li ion battery.
(5) The soft matter phase alone (without the porous membrane) is incapable of stopping dendrite penetration. By impregnating the soft matter phase in a porous membrane with proper pore sizes and porosity levels, the resulting protective layer becomes very effective in blocking dendrite penetration while still providing an impressive ion conductivity.

The invention claimed is:

1. A battery cell, comprising:
(a) an anode comprising an active metal or a metal ion storage material;
(b) a cathode structure;
(c) an ionically conductive protective layer on a surface of the anode and interposed between the anode and the cathode structure, wherein said protective layer is a porous membrane having interconnected pores with a pore volume fraction between 20% and 95% therein and a soggy-sand soft matter phase disposed in said interconnected pores, wherein said soft matter phase consists of 5 to 40% (based on the total volume of the oxide particles and the salt solution) oxide particles dispersed in a non-aqueous alkali, alkaline, or transition metal salt solution; and
(d) a separator or electrolyte layer disposed between said conductive protective layer and said cathode structure.

2. The battery cell of claim 1 wherein said oxide particles are selected from $SiO_2$, $TiO_2$, MgO, $Al_2O_3$, or a combination thereof.

3. The battery cell of claim 1 wherein said oxide particles have a size smaller than 500 nm.

4. The battery cell of claim 1 wherein said oxide particles have a size smaller than 100 nm.

5. The battery cell of claim 1 wherein said oxide particles are acidic.

6. The battery cell of claim 1 wherein said pores occupy a volume fraction of the porous membrane in the range of 50% to 85% inclusive.

7. The battery cell of claim 1 wherein said pores have a size smaller than 10 μm.

8. The battery cell of claim 1 wherein said pores have a size smaller than 2 μm.

9. The battery cell of claim 1 wherein said non-aqueous salt solution comprises a solvent selected from the group consisting of EC, PC, DEC, DMC, EMC, THF, 2MeTHF, 1,2-DME or higher glymes, sufolane, methyl formate, methyl acetate, and combinations thereof and a supporting salt selected from the group consisting of $LiPF_6$, $LiBF_4$, $LiAsF_6$, $LiClO_4$, $LiCF_3SO_3$, $LiN(CF_3SO_2)_2$, and $LiN(SO_2C_2F_5)_2$.

10. The battery cell of claim 1 wherein said non-aqueous salt solution comprises a lithium salt solution.

11. The battery cell of claim 1 wherein said non-aqueous salt solution comprises a zinc or aluminum salt solution.

12. The battery cell of claim 1, wherein said metal ion storage material comprises a metal intercalation compound.

13. A battery comprising a plurality of battery cells, wherein at least one of the cells comprises a cell of claim 1.

14. The battery cell of claim 1, wherein said battery cell comprises a lithium metal cell.

15. The battery cell of claim 1, wherein said battery cell comprises a lithium ion cell.

16. The battery cell of claim 1 wherein said anode is an alkali metal cell selected from a K or Na metal cell, an alkaline metal cell selected from Mg, Ca, or Ba metal cell, a transition metal or other metal cell selected from Zn or Al metal cell, or a combination thereof.

17. A battery cell, comprising:
(a) an anode comprising an active metal or a metal ion storage material;
(b) a cathode structure; and
(c) an ionically conductive protective layer on a surface of the anode and interposed between the anode and the cathode structure, wherein said protective layer is a porous membrane having interconnected pores therein and a soggy-sand soft matter phase disposed in at least one of said interconnected pores, wherein said soft matter phase consists of 5 to 40% (based on the total volume of the oxide particles and the salt solution) oxide particles dispersed in a non-aqueous alkali, alkaline, or transition metal salt solution; wherein said conductive protective layer serves as a separator or electrolyte layer disposed between said anode and said cathode structure.

18. The battery cell of claim 17 wherein said anode is an alkali metal cell selected from a K or Na metal cell, an alkaline metal cell selected from Mg, Ca, or Ba metal cell, a transition metal or other metal cell selected from Zn or Al metal cell, or a combination thereof.

* * * * *